United States Patent [19]
Gullberg et al.

[11] Patent Number: 5,186,193
[45] Date of Patent: Feb. 16, 1993

[54] PARTS WASHER CLEANING APPARATUS HAVING PNEUMATIC VERTICAL AGITATION, STATIONARY BEARING MEANS AND PLATFORM HAVING CONTINUOUS POSITIVE SUPPORT

[75] Inventors: Kim R. Gullberg, Stronghurst; William A. Leser, Rolling Meadows, both of Ill.

[73] Assignee: D. C. Cooper Corporation, Chicago, Ill.

[21] Appl. No.: 682,137

[22] Filed: Apr. 8, 1991

[51] Int. Cl.$^5$ .............................. B08B 3/04
[52] U.S. Cl. ................... 134/105; 134/135; 134/165
[58] Field of Search ............ 134/76, 82, 83, 105, 134/135, 141, 164, 165; 118/425

[56] References Cited

U.S. PATENT DOCUMENTS

| | | | |
|---|---|---|---|
| 2,724,392 | 11/1955 | Cooper | 134/165 X |
| 2,887,210 | 5/1959 | Borodin | 134/76 X |
| 3,020,918 | 2/1962 | Albertson et al. | 134/98 |
| 3,054,411 | 9/1962 | Randall | 134/111 |
| 3,083,716 | 4/1963 | Rowan et al. | 134/141 X |
| 3,378,019 | 4/1968 | Riolo et al. | 134/111 |
| 3,426,772 | 2/1969 | Foster | 134/164 X |
| 4,052,227 | 10/1977 | Delo et al. | 134/56 R |
| 4,407,229 | 10/1983 | Sanborn | 118/425 X |
| 4,453,491 | 6/1984 | Hite et al. | 134/164 X |
| 4,543,182 | 9/1985 | Gramse et al. | 134/111 X |

FOREIGN PATENT DOCUMENTS

| | | | |
|---|---|---|---|
| 955103 | 4/1964 | United Kingdom | 134/141 |
| 961863 | 6/1964 | United Kingdom | 134/141 |
| 1139331 | 1/1969 | United Kingdom | 134/141 |

Primary Examiner—Philip R. Coe
Attorney, Agent, or Firm—Hamman and Benn

[57] ABSTRACT

The present invention relates to a solution parts washer cleaning apparatus with increased vertical pneumatic cleaning agitation and that has a load capacity of up to two tons inclusive, a vertically reciprocating, non-tilting platform having continuous and three-way positive support and adapted to operatively engage an associated beam, an improved bearing arrangement that is mounted fixedly to a frame and designed for enhanced durability in part by remaining above the cleaning solution during operation of the apparatus. The cleaning apparatus has replaceable strips that secured to the corners of the beam. The cleaning apparatus has an automatic shutoff in the event of an emergency in the form of a fusible link.

6 Claims, 9 Drawing Sheets

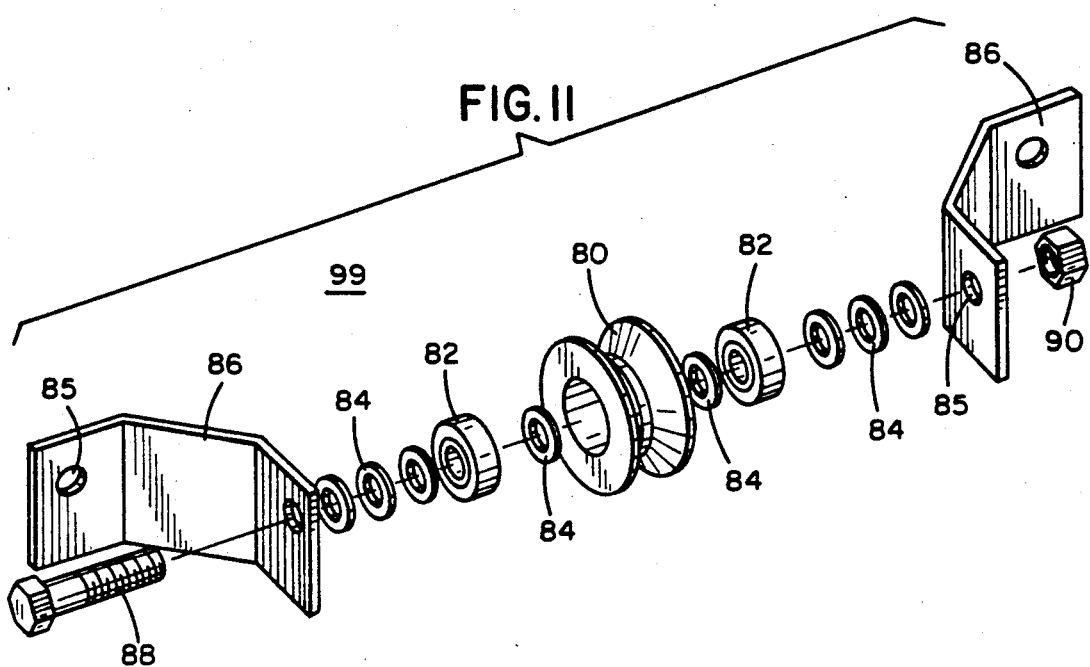
FIG. 11
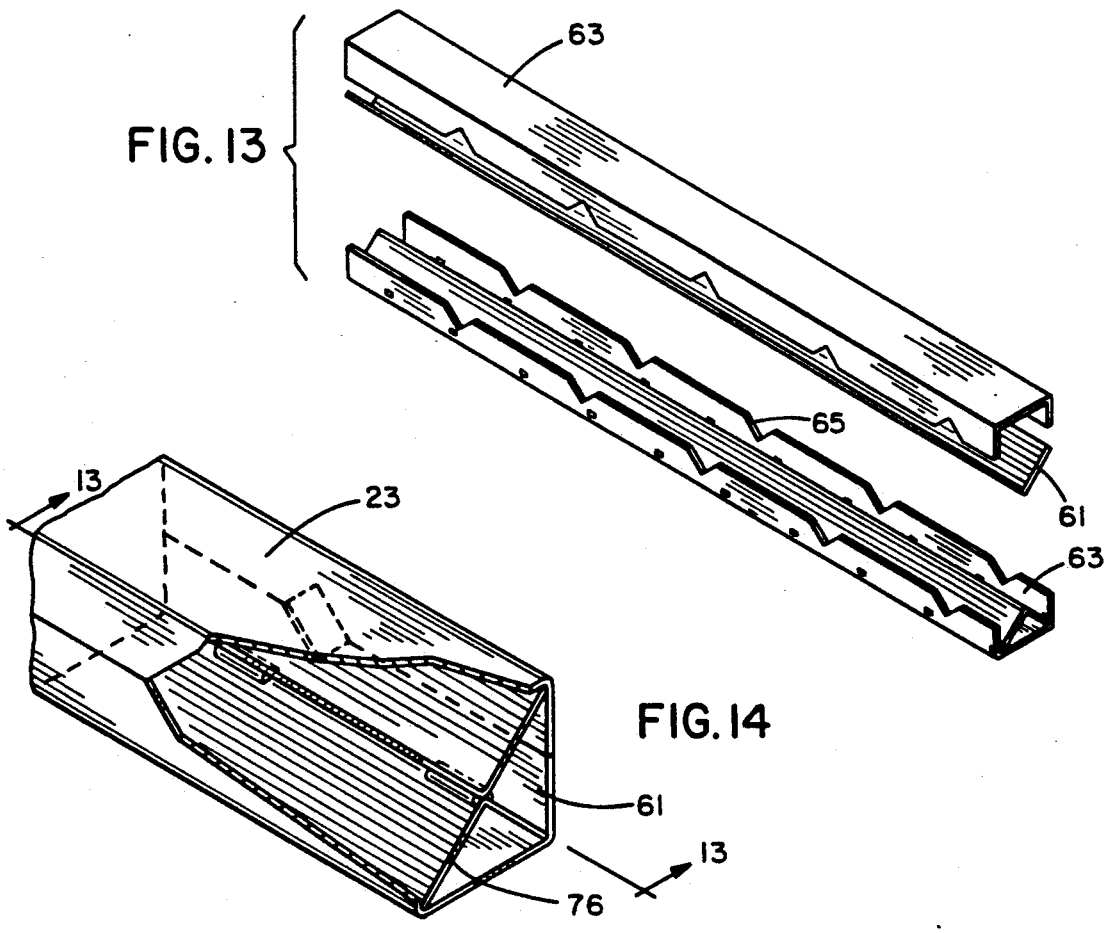
FIG. 13
FIG. 14

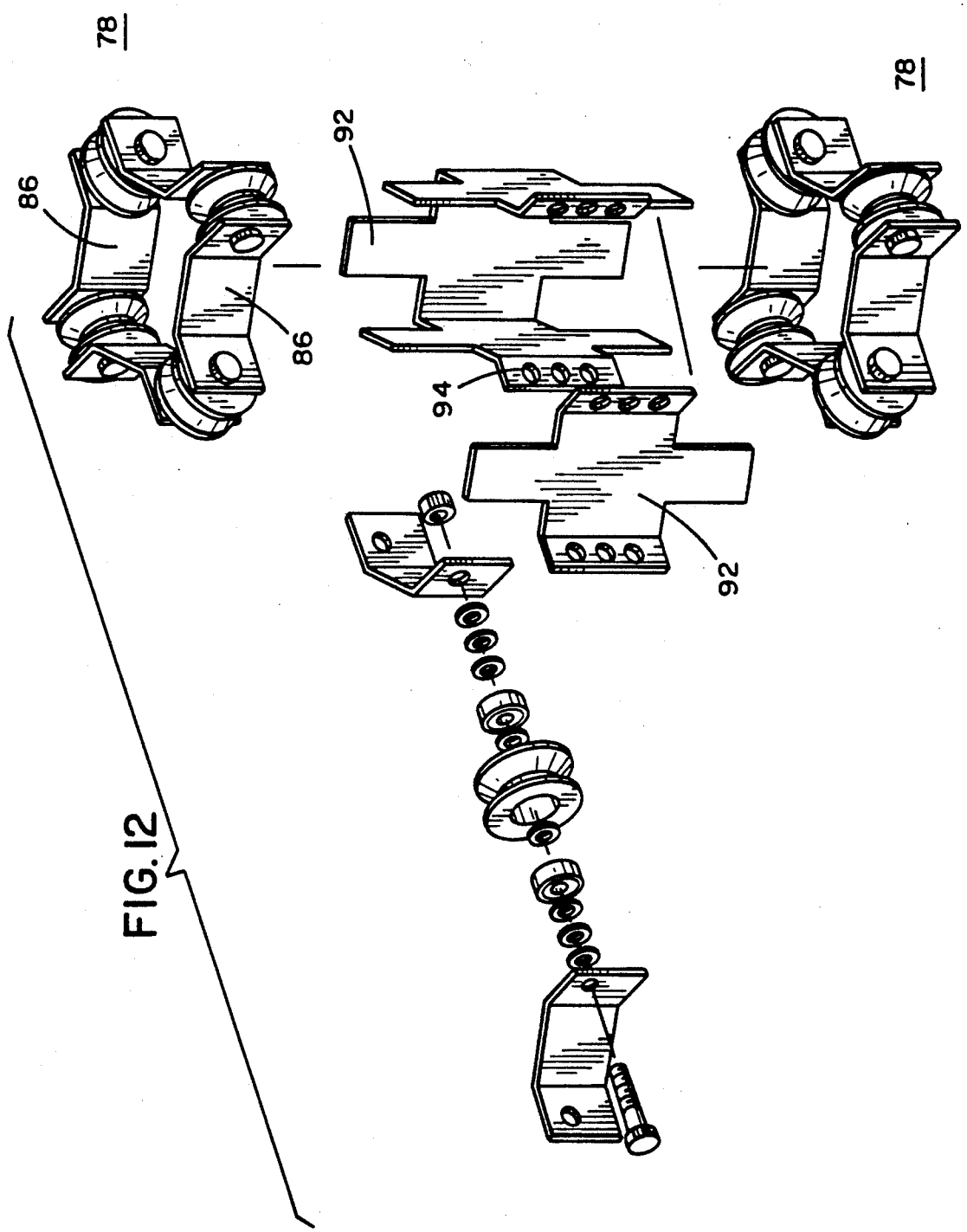

PARTS WASHER CLEANING APPARATUS HAVING PNEUMATIC VERTICAL AGITATION, STATIONARY BEARING MEANS AND PLATFORM HAVING CONTINUOUS POSITIVE SUPPORT

BACKGROUND OF THE INVENTION

The present invention generally relates to a parts washer cleaning apparatus with increased vertical cleaning agitation. In particular, to a solution cleaning apparatus with a vertical reciprocating platform having a continuous and positive support apparatus, an improved stationary bearings configuration that is designed for enhanced durability in its intended environment, and an automatic emergency shutoff fusible tube in the event of the occurrence of a fire.

Oftentimes, state-of-the-art manufacturing processes or techniques require that the various subassemblies or component parts be free of grease or other contaminants prior to fabrication to enhance the level of quality and reliability that is engineered into the completed manufactured product using the components. The degreasing and cleaning of usually greasy, oily, grimy or otherwise contaminated parts will usually require the application of heat and a selected solvent to all of the surfaces of the particular part under very controlled circumstances. Current environmental and regulatory considerations have required domestic manufacturers to eliminate vapor degreasing equipment, and the use of certain solvents, from manufacturing operations in favor of industrial cleaning problems that can be facilitated by specialized solution cleaning system or equipment that is designed to consist of multiple stages (that is, washing, rinsing and drying), which also permits the water cleaning solution and resulting residue be collected in some type of container for later disposal in accordance with various governing environmental regulations. It would also be advantageous to have cleaning equipment that could be utilized in such a manner to avoid worker contact with possible hazardous chemicals or cleaning solutions.

Generally, this type of solution cleaning equipment will have an interior tank, which is filled with an appropriate cleaning solution, which may be heated to a specified temperature, with an associated vertical transport mechanism to permit lowering and raising of a platform on which the parts are placed that require cleaning into the cleaning solution undergoing vertical agitation for a specified period of time, with the cleaning equipment being sealed for the duration of the cleaning cycle to eliminate the possibility of employee contact with any of the harsh or hazardous cleaning solutions that may be safely used. Often this operation will require that the associated interior roller bearings which pertain to the platform be correspondingly submersed into the cleaning solution for the duration of the cleansing cycle. This will result in bearings which will eventually experience accelerated failure over time and require repair or replacement of all the bearings for the equipment. It would be desirable to have a bearing apparatus having multiple stationary bearings cooperating together during operation of the cleaning equipment and which are not submersed into the cleaning solution during the cleaning cycle.

Similarly, often the platform upon which the parts are placed have not been adequately designed to facilitate varying loads, require continuous support of the platform through internal bracing that is lacking, and have the platform supported only in the vertical direction during the lifting of the platform operation with an associated load (in the form of parts to be cleaned) out of the cleaning solution, all of which results in the platform tilting forward under the various dynamic torque forces that are present, and becoming out of proper alignment, as the cleaning equipment is properly, but extensively, utilized over time. While this may pose a safety problem to the operator, this will certainly result in the bearings to wear out faster than originally designed. It would be desirable to have a platform that is positively and continuously supported at all times during the operation of the cleaning equipment.

Occasionally, a workplace emergency may arise involving a fire, potentially a dangerously explosive circumstance given the underlying fact that a flammable cleaning solution or solvent is being used by the cleaning equipment. Should the equipment operator find such an emergency present, it would be desirable for the cleaning equipment to have an automatic shutoff mechanism to reduce the chance of an explosion or a fire from further expanding.

Finally, it would be desirable if the cleaning equipment would facilitate field service by the easy replacement of certain components that are designed and engineered to have intentionally wearable surface and hence requiring regular periodic replacement with the normal and customary maintenance of the cleaning equipment by the end-user, thereby eliminating for the requirement the end-user to return the cleaning equipment to the factory for repair or replacement of all field serviceable components.

The present invention is directed to a new and novel cleaning machine apparatus having a continuous and positively supported platform which is moved in the vertical direction and which results in increased vertical agitation for the cleaning cycle and has improved roller bearings that are stationary and are not correspondingly caused to be submersed into the cleaning solution associated with an interior tank of the cleaning equipment during operation of the equipment, and which has an automatic shutoff feature for those instances of a fire emergency. The present invention is further directed to overcoming these and other shortcomings of the various cleaning machines of the prior art design and construction.

SUMMARY OF THE INVENTION

The present invention relates to a solution parts washer cleaning apparatus having pneumatically agitation with a platform having a continuous and positive support structure that is operatively connected to a vertically reciprocating beam, along with an improved stationary bearing configuration that is intended for enhanced durability by facilitating the bearing configuration remaining above the cleaning solution during operation of the apparatus.

Accordingly, it is an object of the present invention to provide an improved solution parts washer cleaning apparatus that has vertical pneumatic agitation which represents a significant improvement over solution parts washer cleaning apparatus of the prior art design and construction and which does not experience may of the problems of those solution parts washers.

It is another object of the present invention is to provide a solution parts washer cleaning apparatus which operationally has a platform that has continuous and positive support thereof during operation of the apparatus.

Another object of the present invention is to provide a solution parts washer cleaning apparatus which operationally has stationary bearing arrangement that will keep the bearing arrangement above the cleaning solution during operation of the apparatus.

A still further object of the present invention is to provide a solution parts washer cleaning apparatus which has a fusible tube for the automatic stopping or shutting-off of the apparatus in the event of a fire in the workplace.

Briefly, according to one embodiment of the present invention there is provided a pneumatic solutions parts washer cleaning apparatus having increased vertical agitation during operation. The solution parts washer cleaning apparatus has an interior solution tank defining an immersion chamber for receiving and collecting a solution cleaning solution for cleaning parts submersed therein. The chamber has a bottom wall and side walls and has a recessed area of a predetermined size for mounting associated heating apparatus. The washer apparatus has a frame means that is used to continuously stabilize and support the apparatus. An optional exterior protective cabinet enclosure is adapted to receive the washer apparatus. There are means for substantially vertically raising and lowering a platform from a first position to a second position within the interior tank. The platform means has associated support means to continuously and positively support the platform means. The platform means has a first position associated with the operation of the washer apparatus and a second position for when the washer apparatus is not operating. The platform means is adapted to receive an associated beam means. The beam means has a substantially rectangular cross section of a predetermined size with bracing means integral thereto. The beam means has a first end and a second end opposite the first end, the second end adapted to receive the platform means which is operatively affixed to the beam means. Further, the beam means is adapted to raise and lower the platform means between the first and second positions. The pneumatic means of the washer apparatus provides predetermined reciprocating agitation to the beam means, thereby facilitating a vertical reciprocating action of the platform means during operation of the washer apparatus. During operation of the washer apparatus, the frame means provides continuous stabilizing and support to the platform means, thereby completely supporting any load which is placed on the platforms means for cleaning by the washer apparatus. The washer has a plurality of roller and bearing means which are fixedly mounted to the frame means and operatively adapted to engage a respective corner of the beam. There exist certain means for heating the solution cleaning solution which are securely mounted in the recessed area of said interior tank. Also, means exist for closing the exterior enclosure of the apparatus, whereby during operation of the cleaning apparatus the bearing means are disposed at all times to remain above the cleaning solution. Replaceable strips adapted to receive the bearing means are operatively attached to each corner of the beam. A fusible tube provides automatic shut-off of the cleaning apparatus in the event of a fire.

These and other objects of the invention will be apparent when reference is made to the following detailed description and accompanying drawings.

BRIEF DESCRIPTION OF THE DRAWINGS

FIG. 11 is an exploded view of certain of the operative component piecepart members for one of the bearing means used in the solution parts washer cleaning apparatus that is built in accordance with the present invention;

FIG. 12 is an exploded view of certain of the operative component piecepart members for one of the mounting means for a corresponding bearing means used in the solution parts washer cleaning apparatus that is built in accordance with the present invention;

FIG. 13 is an exploded view of certain of the operative component channel members forming the internal bracing of the beam used in the solution parts washer cleaning apparatus that is built in accordance with the present invention; and FIG. 14 is a partial sectional view taken along lines 13—13 of the channel member of FIG. 13 that is used to form the internal bracing having a X-shaped cross-section of the beam that is used in the solution parts washer cleaning apparatus that is built in accordance with the present invention.

DETAILED DESCRIPTION OF THE INVENTION

Figure 1:
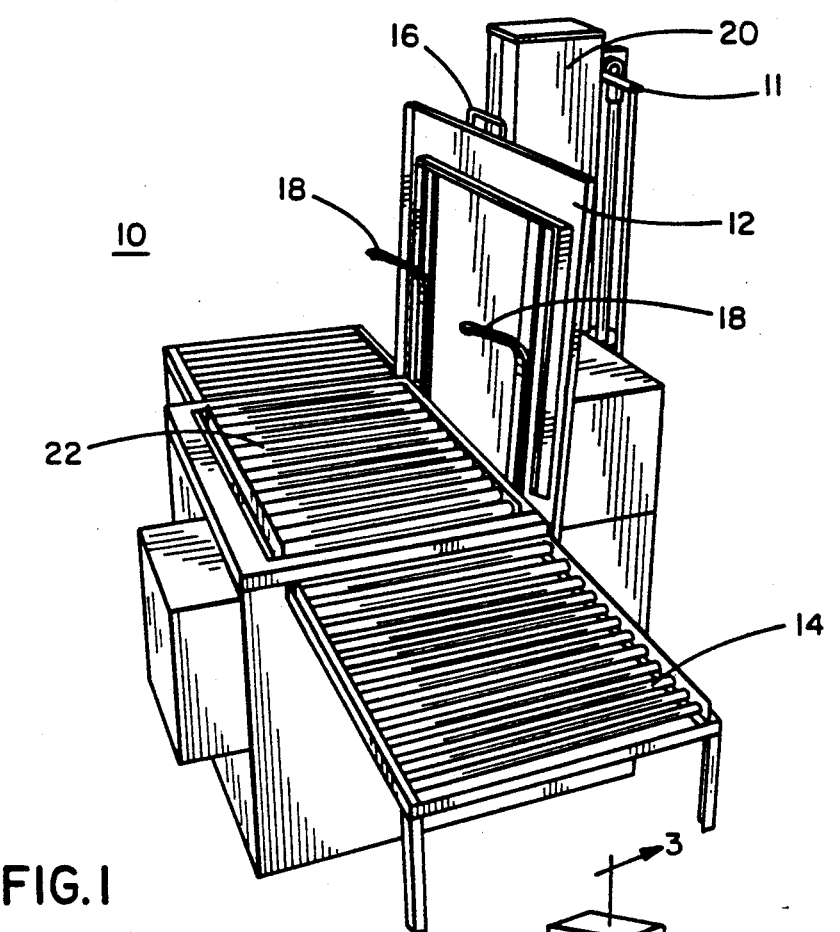
FIG. 1 is a perspective view of the solution parts washer cleaning apparatus which is built in accordance with the present invention and that is utilized in a manufacturing environment in conjunction with an in-line manual conveyor system for the movement of the parts to be cleaned, with the cover for the solution parts washer cleaning apparatus in the "open" position for when the parts washer cleaning apparatus is not be operated.

FIG. 1 is a perspective view of the solution parts washer cleaning apparatus 10 which is built in accordance with the present invention and that is utilized within a manufacturing environment in conjunction with a certain conventional manually powered in-line conveyor system 14 for the movement of the various parts to be cleaned (not shown), with the cover 12 for the solution parts washer cleaning apparatus 10 in the "open" position for when the parts washer cleaning apparatus is not be operated by a operator. Movement of parts to and from the solution parts washer cleaning apparatus 10 is accomplished by the use of an overhead hoist, an in-line manual conveyor system, or by use of an automated, microprocessor controlled conveyor system. A preprogrammed sequence of steps including immersion cleaning, spray rinsing and air drying is controlled by a programmable controller allowing virtually unlimited variations in the process cycles. A closed cover 12 during operation of the cleaning apparatus 10 will decrease heat loss and thereby increase energy savings associated therewith.

The cover 12 has a conventional handle 16 to open and close the cover, and a pair of substantially perpendicularly extending quasi-locking braces 18 that are intentionally designed to physically fit in the small amount of space located between the individual conveyor rollers and further extending into the interior space of the cleaning apparatus 10 when the cover is in the closed position, thereby preventing any side to side movement of the cleaning apparatus 10 during operating of the apparatus. The cleaning apparatus 10 has a vertical stack 20 that extends upwardly and in which is found the rectangular-shaped longitudinal beam 24 (see FIG. 3) to which the platform 22 is secured. The beam 24 will be caused to reciprocate vertically within the stack 20 during operation of the cleaning apparatus 10. The stack 20 has a rear slot 13 (see FIG. 2) extending vertically which allows the clevis 44 (and rear beam 24) to ride freely within the stack 20.

A striker cam rod 11 is operatively connected to associated rocker switches and will provide the rapid vertical movement of the platform 22 within the inner tank of the cleaning apparatus 10 during operation of the cleaning apparatus.

Figure 2:
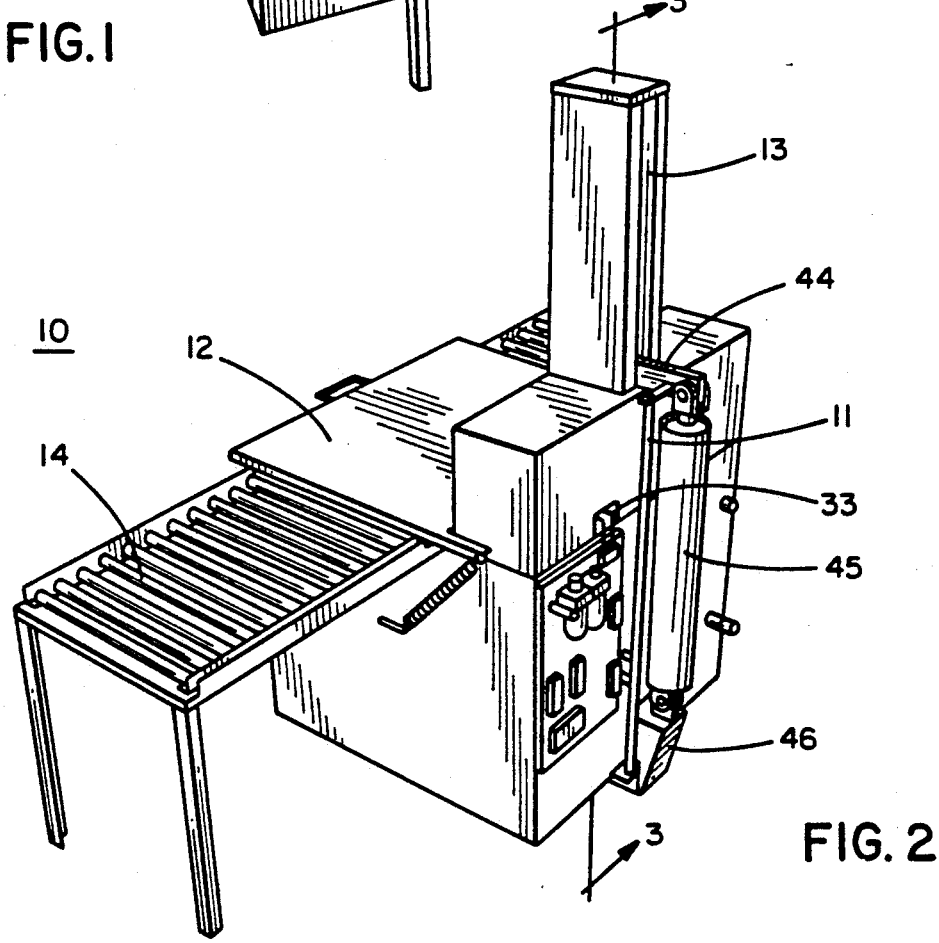
FIG. 2 is a perspective view of the solution parts washer cleaning apparatus which is built in accordance with the present invention that is utilized in a manufacturing environment in conjunction with an in-line manual conveyor system for the movement of the parts to be cleaned, with the cover for the solution parts washer cleaning apparatus in the "closed" position during operation of the parts washer cleaning apparatus.

FIG. 2 is a perspective view of the solution parts washer cleaning apparatus 10 which is built in accordance with the present invention that is utilized in a manufacturing environment in conjunction with an in-line manual conveyor system 14 for the movement of the parts to be cleaned, with the cover 12 in the "closed" or safety position during operation of the parts washer cleaning apparatus 10. As shown in FIG. 2, the solution parts washer cleaning apparatus 10 of the present invention has a modular design that consists of an separate interior tank 26 (see FIG. 3) that is designed for use with hot or cold solution cleaning solutions, thereby allowing an infinite variety of processing steps. Through the use of vertical agitation, all parts to be cleaned are completely immersed in the processing solution, thus eliminating the need for operator contact with possible hazardous chemicals of the cleaning solution. The operator loads the parts to be cleaned onto the platform and starts the cleaning equipment. The cover or doors of the cleaning apparatus automatically opens at the end of the cleaning cycle, with the various sized parts cleaned and dried on the platform, ready for removal by the operator.

During operation of the cleaning apparatus 10, striker cam rod 11 provides for the rapid vertical movement of the platform 22 within the inner tank which will clean all of the parts submersed therein.

Figure 3:
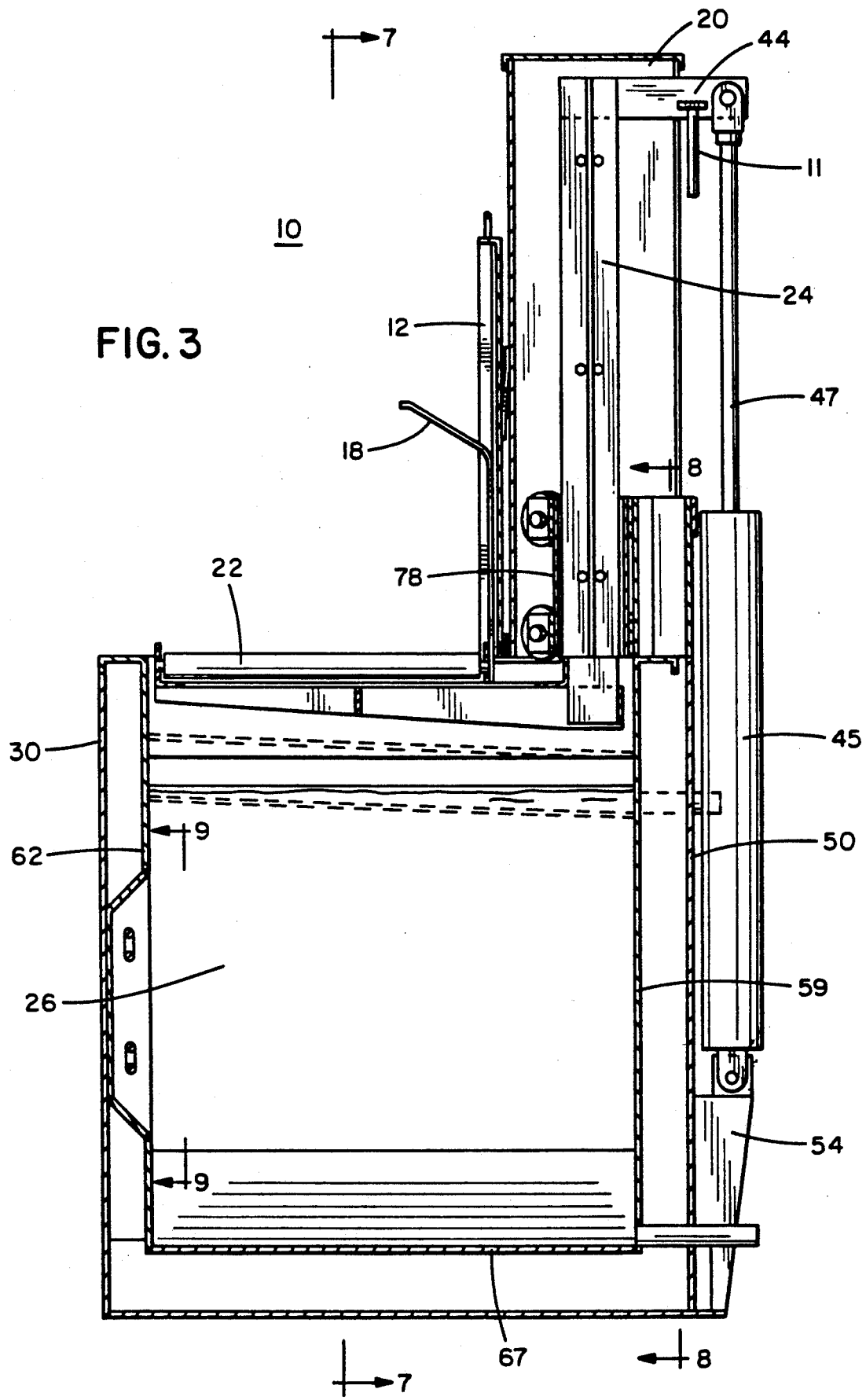
FIG. 3 is sectional view along lines 3—3 of FIG. 2 of the solution parts washer cleaning apparatus which is built in accordance with the present invention, with the cover for the parts washer cleaning apparatus in the "open" position.
Figure 4:
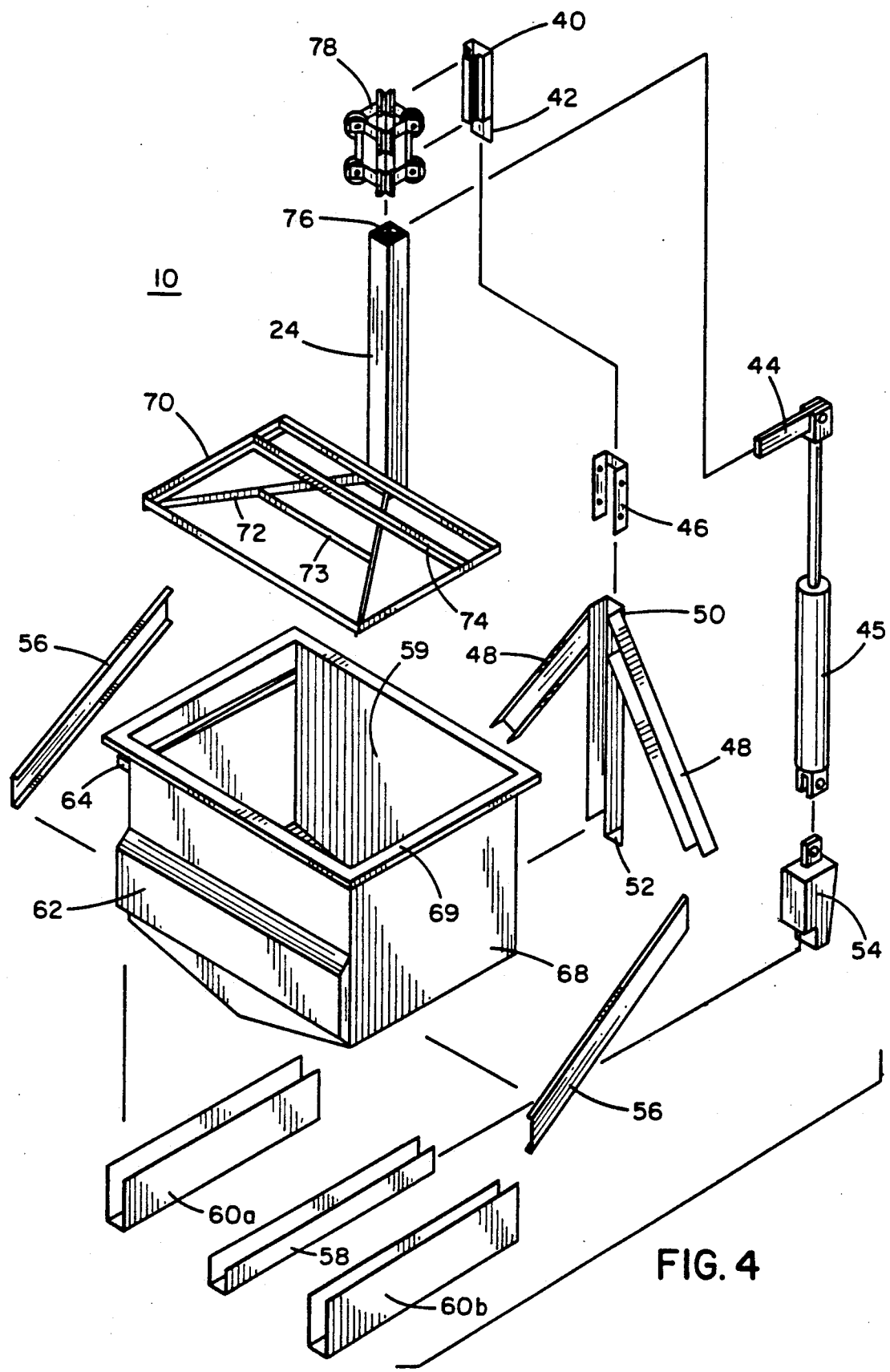
FIG. 4 is an exploded view of certain of the structural frame component members and related operative component members adapted for the solution parts washer cleaning apparatus that is built in accordance with the present invention.

FIG. 3 is sectional view along lines 3—3 of FIG. 1 of the solution parts washer cleaning apparatus 10 which is built in accordance with the present invention, with the cover 12 for the cleaning apparatus 10 in the "open" position. FIG. 4 is an exploded view of certain of the structural frame component members and related operative component members adapted for the solution parts washer cleaning apparatus 10 that is built in accordance with the present invention. As shown in FIGS. 3 and 4, the cleaning apparatus 10 has an exterior protective cabinet 30 which is adapted to receive the various separate and individually designed structural supporting and operative piecepart members for the total cleaning apparatus 10. The cover 12 is hinged to the top of the cleaning apparatus through the use of hinges 13.

A rear rack support 40 is welded perpendicularly to the rear service of the top lip of the tank. The rear support 42 is welded to the rear opening of the rear rack support. A clevis bar 44 is welded to vertical beam 24 and in between angled stiffeners, one end of the clevis bar being secured to a reciprocating rod 47 of a conventional pneumatic cylinder 45. A striker cam rod 11 operatively will strike certain rocker switches resulting in the rapid vertical oscillation of the platform within the inner tank. The bottom end of cylinder 45 is operatively connected to a cylinder base support 54.

A vertical support member 46 is bolted to the rear rack support 40. A pair of rear stiffeners 48 are secured to center rear stiffeners 50 that has a lower extending tab portion 52. A pair of innershell stiffeners 56, center leg 58 and a pair of right and leg legs, 60a and 60b respectively, are operatively connected to form part of the underlying base and support structure for the cleaning apparatus 10. A dedicated space 62, recessed within the interior tank, is further provided for a conventional type of immersion heater. The inner tank 68 has a top lip or edge 69 that extends around the entire circumference of the tank and a scum gutter 64 with an interior opening for continuous return of all overflow cleaning solution during operation of the cleaning apparatus 10.

The platform 22 has a support frame or rack 70 that operates in conjunction with a pair of A-frame supports 72 and 73 respectively, along the certain reinforcement members 74 extending longitudinally within said support frame 70, and accordingly form the overall supporting structure for the platform 22. The support frame 70 is operatively connected to the bottom portion of support beam 24.

The various prior art approaches for a solution parts washer cleaning apparatus generally provide support for the bearing only in the lifting (or vertically up motion) direction. The weight of the parts help provide the required tension that is necessary for the cleaning apparatus of the prior art construction to properly operate. This is to be contrasted to the present inventive cleaning apparatus 10 which provides positive support in both directions of travel, thereby permitting full power to be transmitted in the down stroke from the air cylinder 45 to dramatically increase the resulting cleaning agitation present to the vertically agitating platform 22. Further, as a result of certain A-frame support bracing that is present in the back of the cleaning apparatus 10 and which is connected to a laterally-extending cantilevered gooseneck type of protrusion which extends through the back of the cleaning apparatus 10 to the triple beam feed support platform at the bottom of the cleaning apparatus 10.

Accordingly, this laterally-extending cantilevered gooseneck type of protrusion becomes fully supported from outside the tank, rather than from inside the tank as contrasted with the construction of the prior art. One of the positive results is that the solution parts washer cleaning apparatus 10 effectively transmits lifting force to the front of the apparatus 10, thereby transforming the apparatus 10 into a lift mechanism without requiring the interior tank to be filled with cleaning solution to functionally act as a lift ballast or counterballast, without the danger of becoming top-heavy during operation of the cleaning apparatus 10.

Rear support beam 24 will be caused to vertically reciprocate during the operation of the cleaning apparatus 10. At the top end of the rear support beam 24 there is secured in a stationary manner the associated roller bearing housing and roller bearing arrangement 78. The roller bearing arrangement has top and bottom pairs of V-shaped roller bearings and pairs of interior roller bearings positioned about each corner of said support beam 24.

The vertically extending support beam 24 has certain interior supporting braces members 76 which continuously extend within the beam 24 and which are generally X-shaped and which cooperate with each other. The vertically extending support beam 24 is fabricated by using two pieces which are formed into a general C-shape, with the legs of the C-shape being approximately one-half of the length of the body of the C-shape. A series of triangular notches (not shown) are cut into longitudinal or lengthwise edge of each leg so that the triangular notches are cut into the identical locations on each piece. Another two pieces of the same length are formed into a 90 degree angle such that when the angle is placed inside of the formed C-shaped channel, the two legs make continuous contact with the inside bends of the C-shaped channel and the apex of the angle piece is parallel with the upper legs of the C-shaped channel. The angle is continuously welded to the C-shaped channel along the point of contact between the angle and the C-shaped channel. This process is repeated for each C-shaped channel that is used for the solution parts washer cleaning apparatus 10. The two subassemblies are then placed so that legs of each C-shaped channel align. The triangular notches for each of the legs align, thereby forming a diamond shaped access hole to the contact point of the apex of the two angles welded into the C-shaped channels. The two subassemblies are clamped together while welded through the access points on each side. This results in an X-shaped internally braced beam capable of holding superior load and torque forces during operation of the solution parts washer cleaning apparatus 10. The beam is then welded to the platform using gussets formed and welded into an A-shaped frame, thereby providing load transeptal from the platform back to the support beam 24 with corresponding reduced and minimal deflection associated with the platform 22 during operation of the cleaning apparatus 10.

Figure 5:
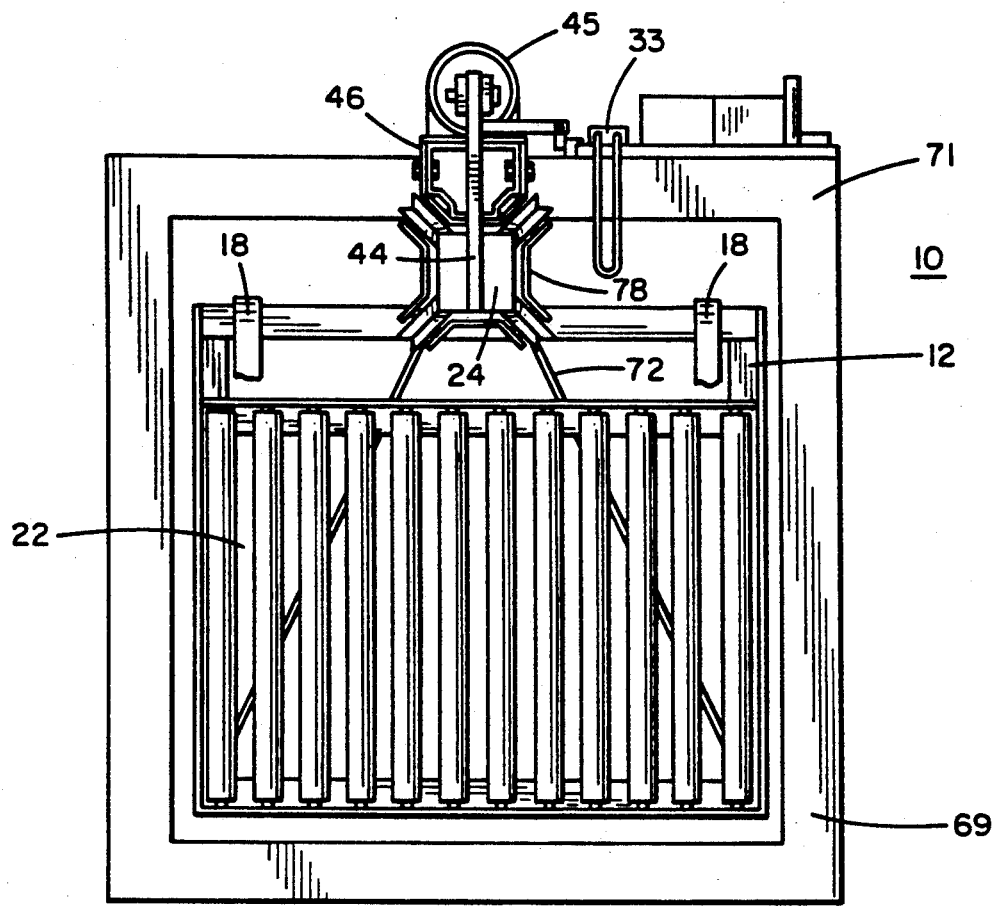
FIG. 5 is a top view of the solution parts washer cleaning apparatus which is built in accordance with the present invention, with the cover for the parts washer cleaning apparatus in the "closed" position.

FIG. 5 is a top view of the solution parts washer cleaning apparatus 10 which is built in accordance with the present invention, with the cover 12 for the cleaning apparatus in the "closed" position, the cover being operated by a pair of conventional hinges 13. With reference to FIG. 5, the platform 22 is centrally positioned within the outer edge 69 of the interior tank. The interior tank is centrally positioned within the total top edge 71 of the top of the equipment apparatus 10. The A-frame support 72 extends beneath the platform 22 and is operatively attached to the bottom end of the rear support beam 24. The A-frame support 72 operates to provide continuous and positive support to the platform 22, thereby providing improved support to the platform 22 at all times. The rear support beam 24 is operatively connected to the clevis 44, which in turn is driven by the reciprocating rod within the air cylinder 45. The roller bearing arrangement 78 is stationary positioned about the rear support beam 24, which freely reciprocates within the central aperture of the roller bearing arrangement 78. In the event of a fire, a fusible tube 33 provides for an automatic termination of the cleaning apparatus 10.

Figure 6:
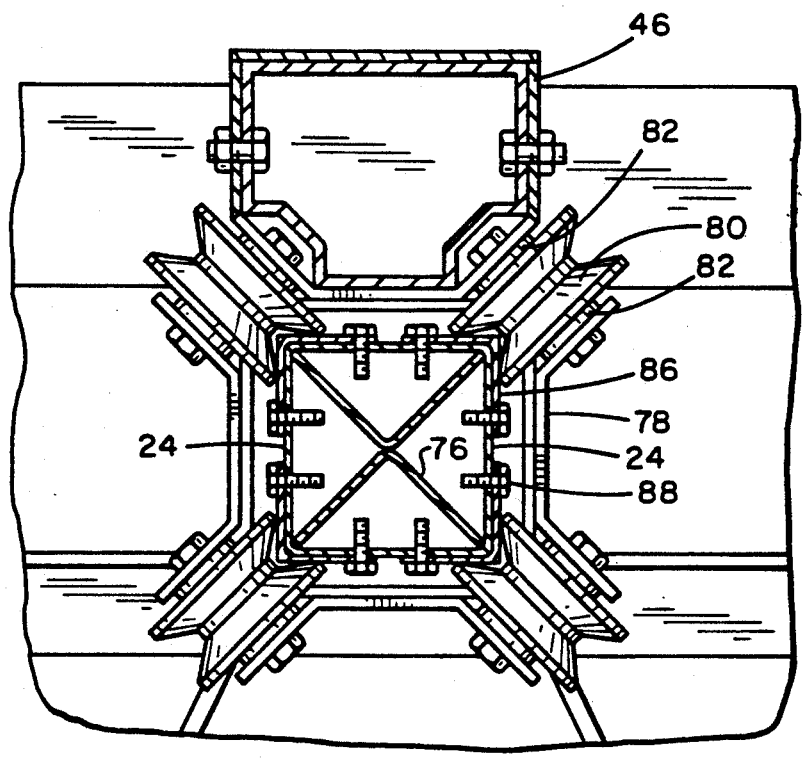
FIG. 6 is an enlarged partial sectional view of the top of the roller bearing and beam apparatus of the solution parts washer cleaning apparatus which is built in accordance with the present invention.

FIG. 6 is an enlarged top of the roller bearing arrangement 78 and support beam 24 of the solution parts washer cleaning apparatus 10 which is built in accordance with the present invention. As shown in FIG. 6, note most particularly the X-shaped interior bracing 76 that extends longitudinally within the support beam 24, and that the roller bearing arrangement 78 has a pair of V-shaped roller bearings 80 at each corner of the support beam 24, in addition to a pair of conventional roller bearings 82 for each V-shaped roller bearing 80 used. The roller bearing arrangement 78 is fixedly attached to the support beam 24 by a plurality of bolts 88 in appropriately sized aperatures 85 found in the associated mounting brackets.

The addition of protective wear strips 86 can be positioned on each of the corners of the beam to eliminate wear and tear of the beam during operation of the solution parts washer cleaning apparatus 10. The wear strips are cut and notched to allow a snug fit on the corners of the beam and are held in place by bolts. The wear strips are constructed of commercially available angle iron. The protective wear strips may be field replaced by the end-user as required without returning the solution parts washer cleaning apparatus 10 to the factory for repair.

Figure 7:
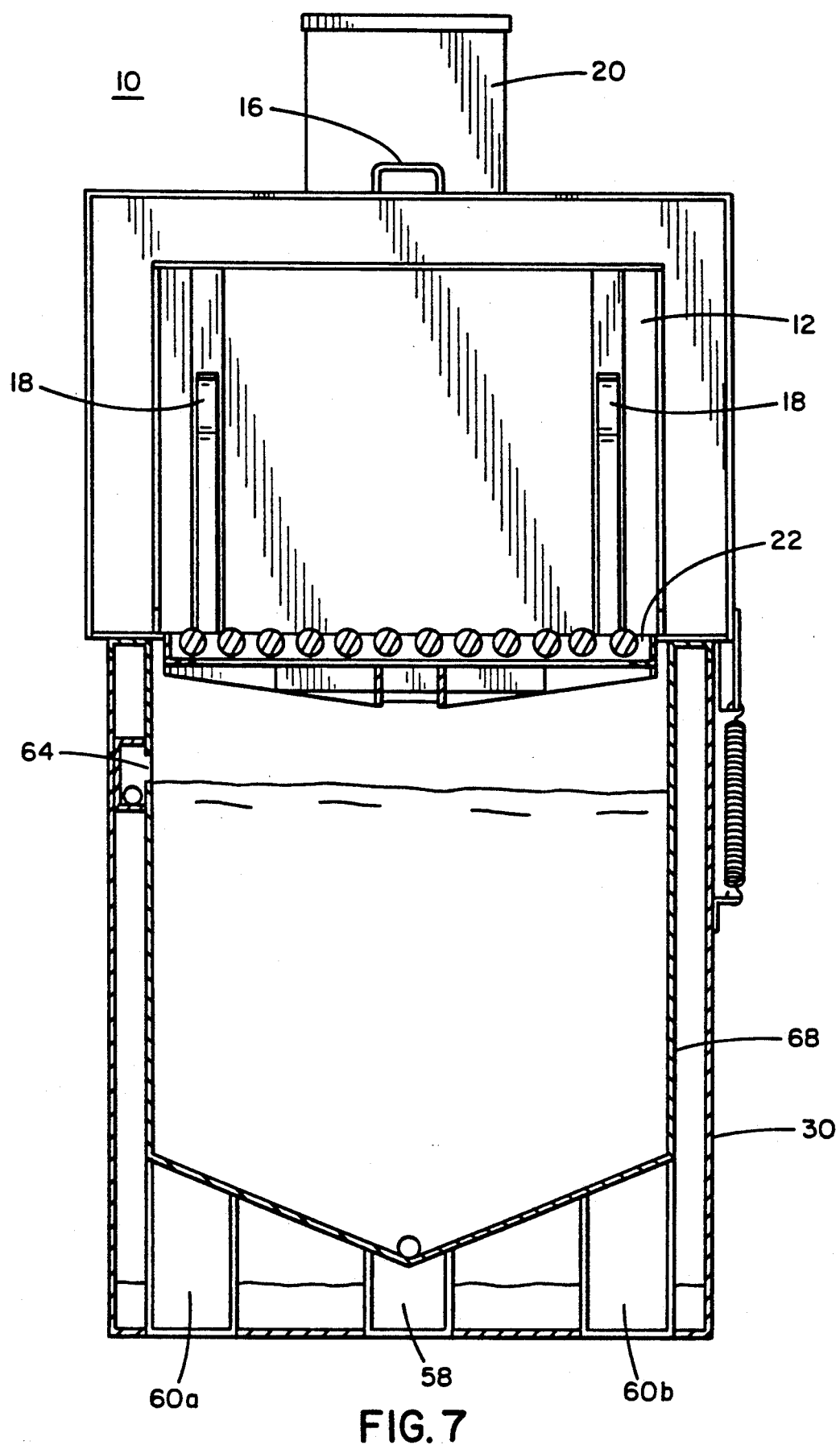
FIG. 7 is sectional view along lines 7—7 in FIG. 3 of the solution parts washer cleaning apparatus which is built in accordance with the present invention.

FIG. 7 is sectional view along lines 7—7 in FIG. 3 of the solution parts washer cleaning apparatus 10 which is built in accordance with the present invention. As shown in FIG. 7, cleaning solution is held within the interior tank 68 which is equipped with an appropriate sized scum gutter 64 which will return the overflow of the cleaning solution to the interior tank.

Figure 8:
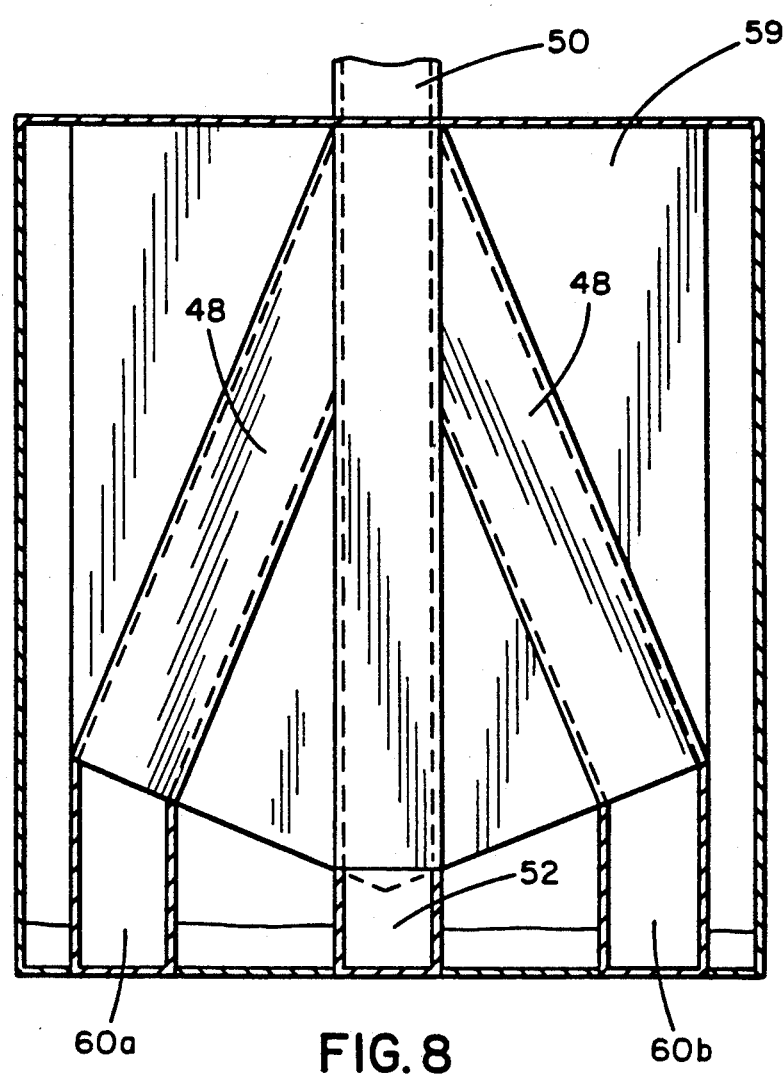
FIG. 8 is partial section view along lines 8—8 in FIG. 3 of the solution parts washer cleaning apparatus which is built in accordance with the present invention.

FIG. 8 is partial sectional view along lines 8—8 in FIG. 3 of the solution parts washer cleaning apparatus 10 which is built in accordance with the present invention. As shown in FIG. 8, the center back stiffener 52 works in association with a pair of back stiffeners 48 to form the connecting foundation members to the three (left, center and right) connecting legs 58, 60a and 60b respectively.

Figure 9:
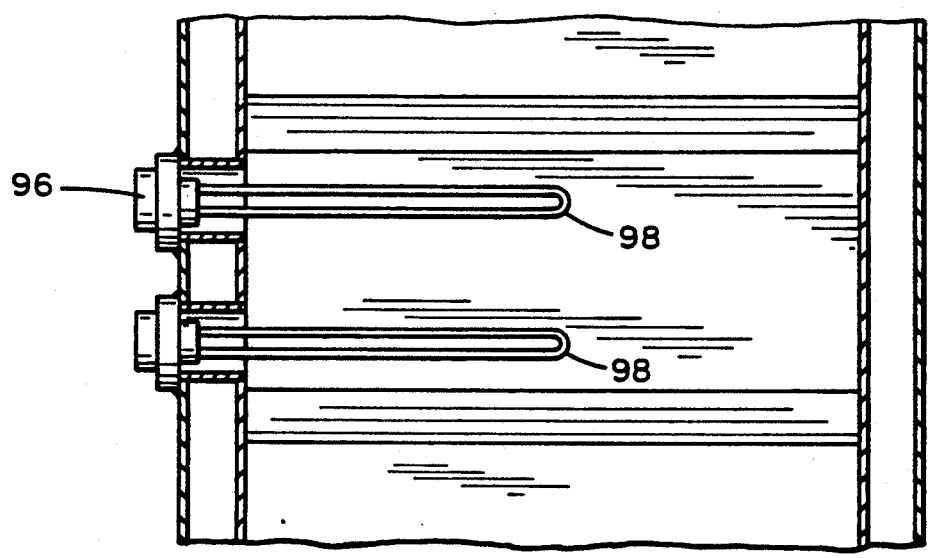
FIG. 9 is a partial top view of the associated heater apparatus positioned in a recessed area within the interior tank holding the cleaning solution which is utilized to heat the cleaning solution used by the solution parts washer cleaning apparatus that is built in accordance with the present invention.

FIG. 9 is a partial top view of the associated conventional immersion heater apparatus 96 having a pair of heating elements 98 that is positioned in the recessed area 62 (see FIG. 4) within the interior tank which holds the cleaning solution used by the solution parts washer cleaning apparatus 10 of the present invention. The immersion heater apparatus 96 is utilized to heat the cleaning solution to the appropriate temperature.

Figure 10:
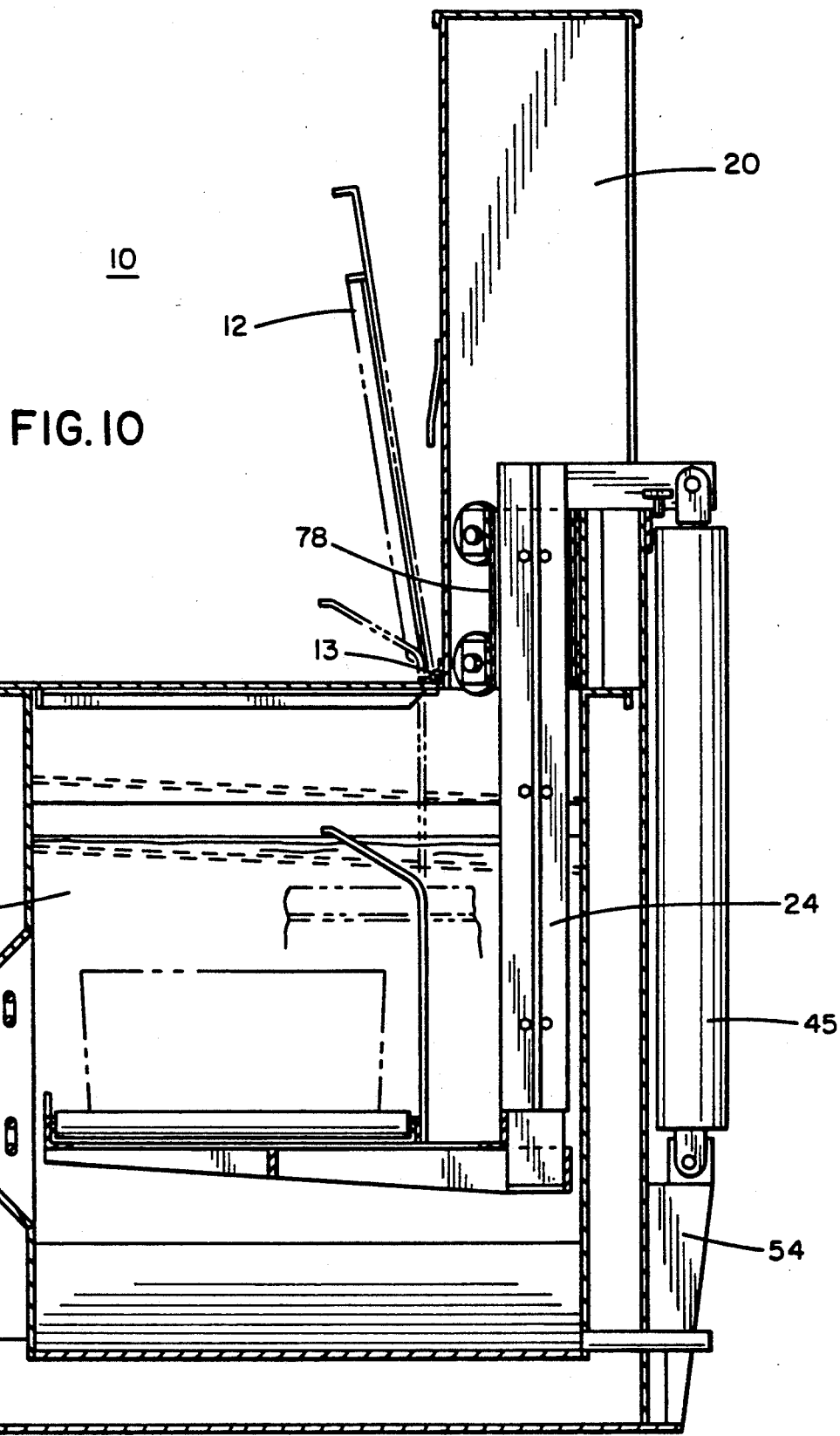
FIG. 10 is side view of the solution parts washer cleaning apparatus which is built in accordance with the present invention depicting vertical agitation of the platform within the interior tank holding the cleaning solution.

FIG. 10 is side view of the solution parts washer cleaning apparatus 10 which is built in accordance with the present invention depicting vertical agitation of the platform 22 within the interior tank holding the cleaning solution. It depicts it vertically through the stationary roller bearing arrangement 78 which is secured outside the tank to the vertical rear support 45 at a designated location. Hinges 13 operatively attach the cover 12 to the top of the cleaning apparatus 10.

FIG. 11 is an exploded view of certain of the operative component piecepart members for one of the bearing means used in the solution parts washer cleaning apparatus 10 that is built in accordance with the present invention. As shown in FIG. 11, the roller bearing arrangement is stationary and the platform is in motion during operation of the cleaning apparatus 10 through the vertically raising and falling of the rear support beam 24. Bearing designs of the prior art have the bearings attached by some method to the platform and depend on stationary guide rails to support the bearings, thereby only providing limited support in a lateral front to back motion fashion, and totally ignores all support for any side to side motion that can be present due to uneven weight distribution caused by the parts on the platform. This will lead to excessive or uneven wear of the bearings during operation of cleaning apparatus of the prior art.

But due to the combination of the internal X-shaped braced beam 24 of the present invention and the dynamics of the bearing housing design, motion in all three axis of motion is anticipated, controlled and supported during operation of the solution parts washer cleaning apparatus 10 built in accordance with the present invention, thereby allowing a load of up to the specific weight capacity of the cleaning apparatus 10, can be positioned off-center on the platform without damage to the cleaning apparatus 10 during operation.

As shown in FIG. 11, the roller bearing arrangement 78 consists of a number of roller bearing assemblies 99. Each roller bearing assembly 99 has a pair of mounting brackets 86 which has an aperture 85. The center of the bearing assembly 99 has a V-shaped roller bearing 80 that is centralized within the assembly. A pair of conventional roller bearings 82 are placed on either side of the V-shaped roller bearing 80 separated by shims 84. A bolt 88 extends through the apertures of each of the piecepart components and is secured by a nut 90, thereby holding the assembly together. There are eight roller bearing assemblies 99 used for the roller bearing arrangement 78, four roller bearing assemblies 99 at the top of the stationary positioned roller bearing arrangement 78 and four roller bearing assemblies 99 at the bottom of the stationary positioned roller bearing arrangement 78.

FIG. 12 is an exploded view of certain of the operative component piecepart members for one of the mounting configuration for a corresponding roller bearing arrangement 78 that is used in the solution parts washer cleaning apparatus 10 that is built in accordance with the present invention. As shown in FIG. 12, a bearing housing 86 is constructed to allow the beam 24 to pass freely through the central area of the roller bearing assembly 99. Each of the roller bearing assembly 99 is fixedly attached to one of four boltdown base supports 92 having apertures 94 disposed to receive a securing bolt. Two sets of four bearings are mounted on a housing and constructed to permit the entire bearing assembly may be fitted on the gooseneck type of laterally extending protrusion of the solution parts washer cleaning apparatus 10 and bolted into place. This provides a positive locking and transmittal of the lifting force through the solution parts washer cleaning apparatus 10 to the floor or foundation of the workplace. The bearings are fitted to provide two bearings on each corner of the beam, thereby providing support during operation of the cleaning apparatus 10 in both vertical directions. Various shims are used to center the beam within the bearing housing.

FIG. 13 is an exploded view of certain of the operative component channel members forming the internal bracing of the beam used in the solution parts washer cleaning apparatus 10 that is built in accordance with the present invention. As shown in FIG. 13, within the support beam 24 is a longitudinally extending X-shaped brace 76 that is made from top and bottom channels 63, that is notched with V-shaped notches 65, and an interior top and bottom angles 61 that are welded to the channels and which form the cross-section X-shaped brace 76 interior brace for the support beam 24.

FIG. 14 is a partial sectional view taken along lines 13—13 of the channel member of FIG. 13 that is used to form the internal bracing 76 having a X-shaped cross-section of the beam that is used in the solution parts washer cleaning apparatus 10 that is built in accordance with the present invention. As shown in FIG. 14, the top and bottom angles 61 are welded to the channels 23 to form the internal bracing 76 for the rear support beam 24. The V-shaped notches 65 on the channels 23 permit adjustment of the interior angles 61 for proper alignment and access to the internal angles 61 for purposes of welding the angles 61 to the channels 23.

While a specific embodiment of a new and novel solution parts washer cleaning apparatus has been described for the purpose of illustrating the manner in which the invention may be used and made, it should be understood that although the invention has been described by reference to particular embodiments thereof, many changes and modifications of the invention may become apparent to those skilled in the art without departing from the spirit and scope of the present invention. All such modifications and changes as may reasonably and properly be included within the scope of our invention are intended to be included herein. Therefore, this invention should not be limited in scope to the particular embodiments shown and described herein, but only by the true spirit and scope of the basic underlying principles disclosed in the accompanying claims that follow.

Accordingly, I claim:

1. A pneumatic parts washer apparatus, the apparatus having associated pneumatic means for facilitating a predetermined reciprocating agitation, the apparatus comprising in combination:

platform means, the platform means having support means for the continuous and positive support thereof, the platform means having a first position associated with the operation of the apparatus and a second position for when the apparatus is not operating;

beam means, the beam means having a substantially quadrilateral cross section of a predetermined size with bracing means integral thereto, the beam means having a first end and a second end opposite the first end, the second end adapted to receive the platform means operatively affixed thereto, the beam means adapted to raising and lowering of the platform means between the first and second positions, the pneumatic means of the apparatus providing the predetermined reciprocating agitation to the beam means, thereby facilitating a substantially vertical predetermined reciprocating action of the platform means during operation of the apparatus, the platform means being immersed in a cleaning solution during at least a portion of its substantially vertical predetermined reciprocating action, whereby parts are cleaned;

frame means for continuously stabilizing and supporting the platform means during operation of the apparatus, thereby completely supporting a load of a predetermined weight of material placed on the platform means for cleaning by the apparatus during operation of the apparatus;

solution tank means defining a leakproof, immersion chamber for receiving and collecting a cleaning solution for cleaning parts submersed therein, the chamber having a bottom floor and side walls;

bearing means, the bearing means having a first end and a second end opposite the first end, the bearing means having a plurality of rollers at predetermined locations at the first and second ends, thereby defining a centrally disposed aperture, the bearing means being fixedly mounted to the frame means, the rollers adapted to engage each corner of said beam means to facilitate passage of said beam means through the aperture of the bearing means during operation of the apparatus;

means for raising and lowering the platform means from the first position to the second position;

means for heating the cleaning solution; and means for closing the apparatus prior to operating the apparatus;

whereby during operation of the apparatus the bearing means are disposed to remain above the cleaning solution.

2. The apparatus according to claim 1, wherein the integral bracing means has a substantially X-shaped cross section.

3. The apparatus according to claim 1, wherein the support means comprises a first substantially A-frame support of a predetermined size positioned beneath the platform means for operatively securing the platform means to the beam means and a second substantially A-frame support of a predetermined size for operatively securing the bearing means to the frame means, and means for fixedly securing the A-frame supports to the frame means at predetermined locations, thereby providing load transept from the platform means to the beam means with reduced and minimal deflection of the platform means.

4. The apparatus according to claim 3, wherein the means for fixedly securing the first and second supports to the frame means at predetermined locations is a weld.

5. The apparatus according to claim 1, further comprising means for substantially centering the beam means within the bearing means, the means for substantially centering the beam means within the bearing means comprising a plurality of shims of predetermined sizes.

6. The apparatus according to claim 1, wherein said immersion chamber comprises a recessed area, said means for heating operatively disposed in the recessed area of the immersion chamber.

* * * * *